United States Patent Office 2,770,166
Patented Nov. 13, 1956

2,770,166

IMPROVEMENTS IN AND RELATING TO OPTICAL APPARATUS FOR PRODUCING MULTIPLE INTERFERENCE PATTERNS

Dennis Gabor, London, England, assignor to National Research Development Corporation, London, England Application June 30, 1952, Serial No. 296,315

Claims priority, application Great Britain July 6, 1951

13 Claims. (Cl. 88—39)

This invention relates to optical apparatus of the kind with which a specimen or a portion thereof can be illuminated by an illuminating beam of coherent light and a photographic record can be obtained of a specimen interference pattern produced as a result of the illumination. The term "coherent light" refers to monochromatic light supplied from a single source of small dimensions. The said specimen illuminating beam, after diffraction at the specimen or the illuminated portion thereof, constitutes an information-carrying beam and the said interference pattern results from the interference of the information-carrying beam with a background beam which has not been affected by the specimen. If the photographic record is suitable processed and illuminated, a magnified representation of the specimen, or the illuminated portion thereof, can be reconstructed in space. Optical apparatus of this kind have been described in the Proceedings of the Royal Society, Section A, volume 197, 1949, at pages 454 to 487 and in the Proceedings of the Physical Society, Section B, volume 64, 1951, at pages 449 to 469.

Hereinafter, when a specimen is referred to, the word is to be understood as including the illuminated portion thereof, unless the contrary intention is stated.

The photographic record obtained with optical apparatus of the kind described above has been termed a "hologram" and this name will be used hereinafter. When producing a hologram it is essential that the background beam with which the information-carrying beam is brought to interference should be of high intensity as compared with the information-carrying beam.

In the optical apparatus described in the above-mentioned publications the magnified representation of the specimen derived from the hologram is always accompanied by a conjugate magnified representation of the same intensity, but displaced in space from the first-mentioned representation. It can be arranged that, when the first-mentioned representation is viewed with maximum sharpness and minimum distortion, the conjugate representation is diffused and distorted.

The presence of the conjugate representation, even when diffused and distorted, severely limits the field of application of such optical apparatus, and it is an object of the present invention to provide optical apparatus of the kind described with which there can be obtained a photographic record of such a nature that, on suitable illumination of the said record a single magnified representation of the specimen is obtained, the conjugate representation being eliminated. A photographic record in accordance with the present invention comprises two holograms.

According to this invention optical apparatus of the kind described, and adapted for use with a source of coherent light, includes means for illuminating with coherent light from the source a plane in which a specimen to be examined can be located, and means for splitting the light after incidence upon said plane into two separate information-carrying beams of approximately equal intensity, and for directing upon separated portion of a plane in which a photosensitive surface can be located each of said information-carrying beams together with a different one of two background beams of coherent light derived from the same source to produce interference between each information-carrying beam and its respective background beam, each of these background beams being of high intensity relatively to the intensity of the image-carrying beams and the phase displacements of the wave fronts of the two background beams relatively to the wavefronts of their respective information-carrying beams differing by an odd number of quarter waves.

Apparatus embodying the invention will now be described, by way of example, with reference to the accompanying schematic drawings wherein.

Figures 1A, 2:
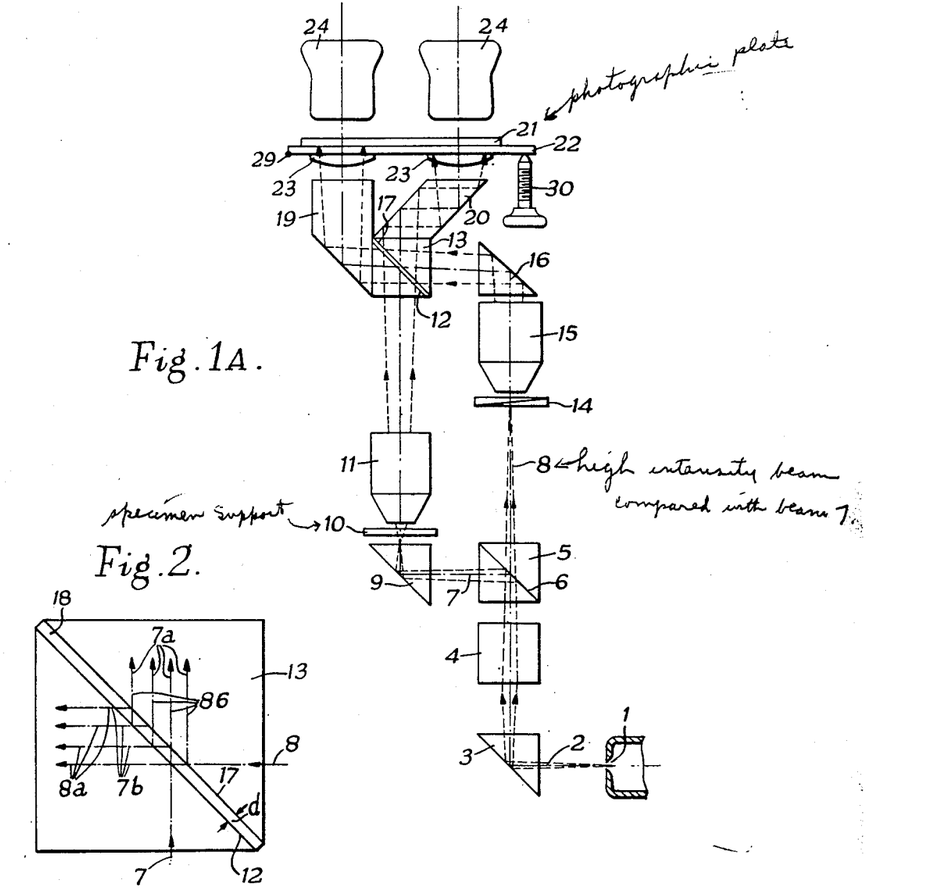
Figure 1A shows a first apparatus.
Figure 2 shows, to a larger scale, one of the optical elements of the apparatus in Figure 1.

Referring now to Figure 1A, monochromatic light from a source (not shown) falls on to an aperture 1, which is sufficiently small to ensure spatial coherence of a resulting light beam 2. The beam 2 is directed by a total-reflection prism 3 through a condenser lens 4 and on to a beam-splitting prism 5. The prism 5 has a beam-splitting surface 6 of relatively high-transmission and low-reflection efficiency (e. g. the surface is very lightly silvered or aluminised), so that the beam 2 is split into a relatively low-intensity specimen illuminating beam 7 which is to traverse the specimen and a relatively high-intensity background beam 8 which is to by-pass the specimen. Preferably, the intensity of the beam 7 is between 10% and 0.05% of the intensity of the beam 8.

The specimen illuminating beam 7 traverses a totally-reflecting prism 9 and a specimen supported on a transparent slide 10, the resulting information-carrying beam traversing an objective 11 and being incident upon a first surface 12 of a prism 13 (shown enlarged in Figure 2) which is of a type that hereinafter will be referred to as a "quadrature prism." The background beam 8 traverses a wedge compensator 14, an objective 15 (which is similar to the objective 11 so that the optical path lengths for the two beams are rendered approximately equal) and a totally-reflecting prism 16, and is incident upon a second surface 17 of the quadrature prism 13. The compensator 14 is used for making small changes in the length of the optical path traversed by the beam 8, so that it can be made equal to the optical path length of the beam 7. The condenser lens 4 produces an image of the aperture 1 in or near to a plane containing the specimen and thereby ensures that full use is made of the light available from aperture 1. It is not necessary for the last-mentioned image to be focused accurately; this will be explained in greater detail hereinafter.

In the quadrature prism 13, one form of which will be described in detail later, the surfaces 12 and 17 and an intermediate transparent layer 18 (Figure 2) are such that the beams incident on the surfaces 12 and 17 are transmitted and reflected with approximately equal efficiency, and predetermined phase displacements are produced between the reflected and transmitted beams resulting from each of the beams 7 and 8. The transmitted beam 7a from the information-carrying beam 7 is superimposed on the reflected beam 8b from the background beam 8 and the reflected beam 7b from the information-carrying beam 7 is superimposed on the transmitted beam 8a from the beam 8. The condition which must be fulfilled before the conjugate representation can be eliminated is that the sum of the phase displacement between 7a and 8b and the phase displacement between 8a and 7b is an odd number of quarter waves (i. e. a quarter wave or an odd multiple thereof). This condition can also be expressed as follows: the difference of the phase difference between 7a and 8b on the one hand, and the phase difference between 8a and 7b on the other hand, must be an odd number of quarter waves.

Prisms 19 and 20 are provided in association with the quadrature prism 13 and are so arranged that the transmitted and reflected information-carrying beams 7a and 7b each undergo two reflections and, thus, are incident on the photosensitive surface of a photographic plate 21 with the same orientation. The plate 21 is supported by a frame or slide 22. Preferably a field lens 23 is disposed in the path of each of the combined beams, the power of each lens being such that the wavefronts of the background beams 8a and 8b, when incident on the plate 21, are plane. Eye-pieces 24 are provided for focusing the images which are to be recorded if it is desired to view them, but the eye-pieces are not necessary parts of the microscope. It will be apparent that as long as the quadrature prism 13 has been made correctly the required difference between the two phase displacements is obtained automatically and the position of the photographic plate is not critical. Thus, any displacement of the plate does not alter the phase displacement between the two combined beams 7a and 8b, since the two optical paths are increased by equal amounts and, similarly, there is no change in the phase displacement between the other two combined beams 7b and 8a.

The mathematical theory of the process of producing the hologram has been explained fully in the publications referred to above. Thus it has been shown that if a strong, uniform, coherent background illumination is superimposed on the interference pattern produced by diffraction at the specimen, the interference pattern being represented as is usual by two components at right angles to each other, the pattern that results is the same as if the original pattern possessed only the component in phase with the background illumination, the component in quadrature with the background illumination being effectively suppressed. The holograms in accordance with the present invention consist of two photographs in which the phase displacements of the wavefronts of the two background illuminations relatively to the wavefronts of their respective interference patterns fulfill the above-mentioned condition that they should differ by an odd number of quarter waves. The effect is, therefore, that the two photographs are complementary, each containing only the component of the original interference pattern which is suppressed in the other. If now the two photographs are each illuminated with a uniform coherent background, the phases of the two background illuminations being displaced by an odd number of quarter waves relatively to one another, only one magnified representation of the original object is obtained, the conjugate representation being eliminated.

The reason why a satisfactory hologram can be produced with a relatively low-intensity information-carrying beam 7, despite the presence of the relatively high-intensity background beam 8 is that with coherent illumination the amplitudes are added and not the intensities. For example, if the intensity of the information-carrying beam is only 1% of the intensity of the background beam, its amplitude will be 10% of that of the background beam and, considering the two limiting cases of the two beams exactly in phase and out of phase, the resultant intensity of the photographic image varies from $(1+0.1)^2 = 1.21$ to $(1-0.1)^2 = 0.81$, which is a fairly strong contrast.

In the apparatus described both the low-intensity information-carrying beams 7a and 7b and the high intensity background beams 8a and 8b are recorded in the holograms, although the only light incident on the specimen is the relatively low-intensity specimen illuminating beam 7. Thus, it is possible to use the microscope to obtain useful records in cases where they might not otherwise be obtainable, or if obtainable might not be useful, due to the deleterious effect of illuminating some specimens with the relatively high-intensity background beam. A representation can be obtained when as little as 0.01% of the light required for adequate exposure of the photographic plate actually traverses the specimen.

Figure 1B:
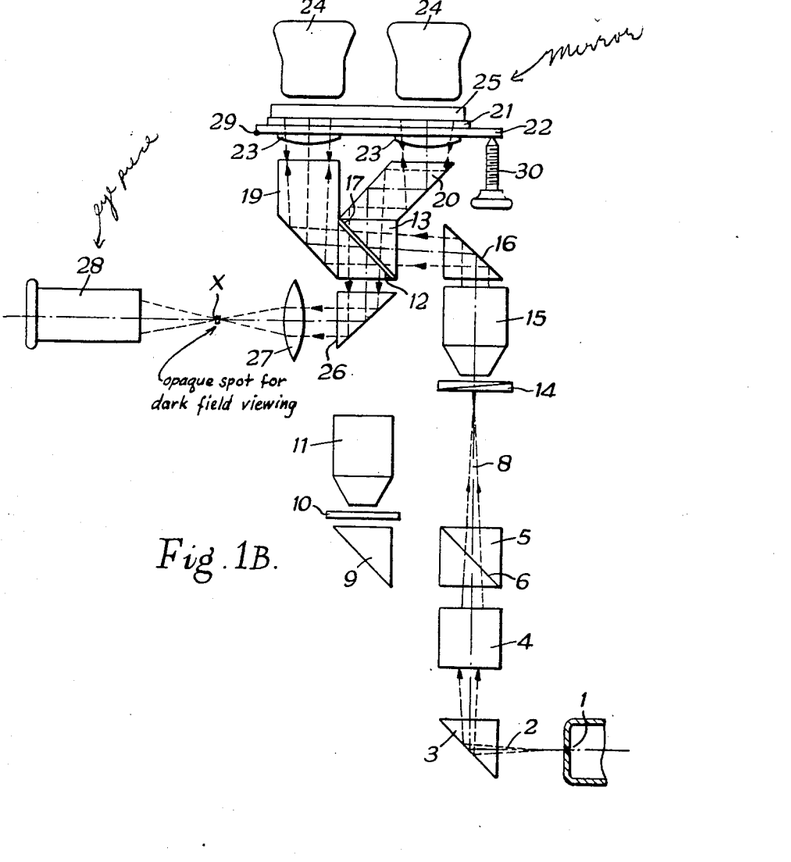
Figure 1B shows the apparatus of Figure 1A modified for viewing the holograms produced thereby.

Referring now to Figure 1B, when the optical apparatus is to be used for viewing the two holograms of a photographic record in accordance with the invention a face-silvered mirror 25 is placed above the plate 21 with its silvered face in contact with the emulsion and a totally-reflecting prism 26 is inserted in the path of the information-carrying beam 7. The holograms are viewed only by the light of the two background beams 8, the prism 26 preventing the light of the information-carrying beam 7 reaching the plate 21. For the sake of clarity in the drawings the lines representing the information-carrying beams 7, or their equivalents, are omitted from Figures 1B, 3B and 4B. Light from the two beams 8a and 8b traverses the plate 21, is reflected by the mirror 25 and re-traverses the plate, the representation obtained being viewed by means of an optical system comprising a lens 27 and an eyepiece 28. It is now necessary to ensure that the two background beams 8a and 8b are accurately an odd number of quarter waves out of phase with each other, since the two beams 7a and 7b are no longer present, and the phase displacement between the two background beams as the frame 22 is tilted about an axis 29 perpendicular to the plane of the drawing. Therefore, a micrometer screw 30 is provided to enable the tilting of the frame to be varied. The correct position for the frame 22 is easily recognised, since interference fringes produced around edges which are sharply focused by the viewing optical system (27 and 28) disappear only if the phase displacement is an odd number of quarter waves.

The eyepiece 28 is adjusted until the representation of the specimen is sharply focused in its field. It is now possible to examine the representation precisely as if it were the original specimen, magnified in all three dimensions. For example, the optical viewing system 27, 28 shown in Figure 1B, which enables the representation to be viewed in a bright field with amplitude contrast, can be replaced by a phase contrast microscope and the representation viewed with phase contrast. It is also possible to view the representation in a dark field with amplitude or phase contrast.

It is often preferred to view the representation in a dark field, this method of viewing being particularly advantageous when low intensity illumination of the specimen has been used in the production of the holograms. Methods of producing a dark field are described in the publications mentioned above. In the present case a small opaque spot can be introduced between the lens 27 and the eyepiece 28 in a plane at X in which a real image of the aperture is formed so as to intercept the light forming the said real image.

An advantage of optical apparatus of the kind specified is that it is not necessary to ensure that the specimen and the photosensitive surface lie accurately in conjugate planes of the objective 11. The effect of altering the relative positions along the optical axis of the specimen and the photographic plate is, when the representation is obtained, merely to alter the position of the representation along the optical axis of the viewing system 27 and 28. Thus, exposures can be made without any preliminary focusing and even if the specimen is exposed to the specimen illuminating beam 7 whilst the optical system is adjusted approximately, the time of such exposure is much less than it would be if the optical system had to be adjusted accurately. Similarly, when the holograms are viewed the shape of the wavefronts of the two background illuminations is not critical, since the effect of varying this shape (i. e. by adjusting the position of the objective 15 along the optical axis) is to move the representation in a direction parallel to the optical axis of the viewing optical system. This feature has been discussed in the second of the above-mentioned two publications.

The quadrature prism 13 is shown in detail in Figure 2 and consists of two triangular prisms having thin, partly-reflecting and partly-transmitting layers of metal or the like deposited on their surfaces 12 and 17, and separated by a layer 18 of transparent material which, preferably, has a refractive index not very different from that of the glass of the prisms. Gold or silver are suitable materials for the layers on the surfaces 12 and 17, and transparent aluminum oxide or evaporated quartz for the transparent layer 18. It can be shown that the phase displacement between the reflected and transmitted waves is proportional to the thickness $d$ of the layer 18, and depends in a somewhat complicated way on the optical properties of the thin metal layers.

A layer 18 which gives the quadrature prism 13 the required light-reflecting, -transmitting and -phase-shifting properties has a thickness of $d=0.177\lambda$, $\lambda$ being the wavelength in the material of the layer 18 of the monochromatic light used. For example, if the refractive index of the material is 1.52 and if the green mercury line (5461 A. U.) is used, a suitable value of $d$ is 640 A. U. This value for $d$ is obtained assuming that the metal layers are of negligible thickness and negligible absorption, with a reflection coefficient of 0.27 for each. If the absorption is not negligible the reflection coefficient must be slightly reduced to make the reflected and transmitted portions of equal intensity, and the thickness of the layer 18 must also be slightly reduced to give a phase displacement of the required magnitude. As the optical properties of thin metal layers cannot be predicted in advance, corrections, for example in the thickness of the layer 18 or of one of the metal layers, must be made as the prism is being constructed, the above figures serving only as a first approximation.

A particularly simple and accurate method of making the quadrature prism 13 is as follows. A layer of silver is deposited by evaporation on, say, the surface 12 of the corresponding triangular prism, the thickness of the layer being estimated by observation of its reflection coefficient. The deposition process is stopped when the coefficient reaches about 25%. Then a layer of aluminum is deposited, again by evaporation, on the silver layer until the reflection coefficient reaches about 60%. The coated surface is now exposed to humid air for a few hours until the aluminum layer is entirely converted into transparent aluminum oxide, the reflection coefficient decreasing to approximately its former value of 25%. This layer of transparent aluminum oxide constitutes the transparent layer 18. A second layer of silver is now deposited on the layer of aluminum oxide until the reflection coefficient reaches about 50% and the second triangular prism is then fixed accurately in position (e. g. using Canada balsam or other suitable cement) with its surface 17 in contact with the second silver layer. The phase displacement produced by the completed quadrature prism can be measured accurately in the apparatus itself by introducing a weak lens into the path of one of the beams 7 and 8. The two interfering wavefronts will then have a slight curvature relative to one another and the two photographs obtained on the plate 21 are of systems of Newton rings. If the prism is correct then the phase displacement between the two fringe systems must be an odd number of quarter fringes.

Figure 3A:
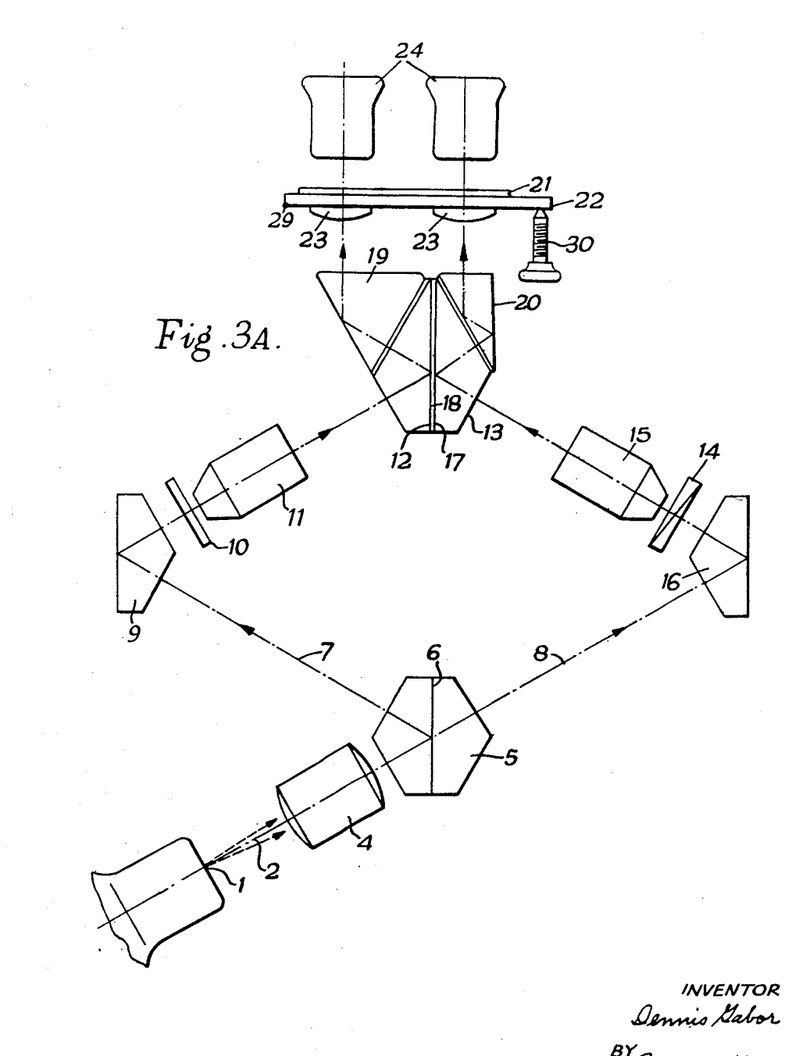
Figure 3A shows a second apparatus.
Figure 3B:
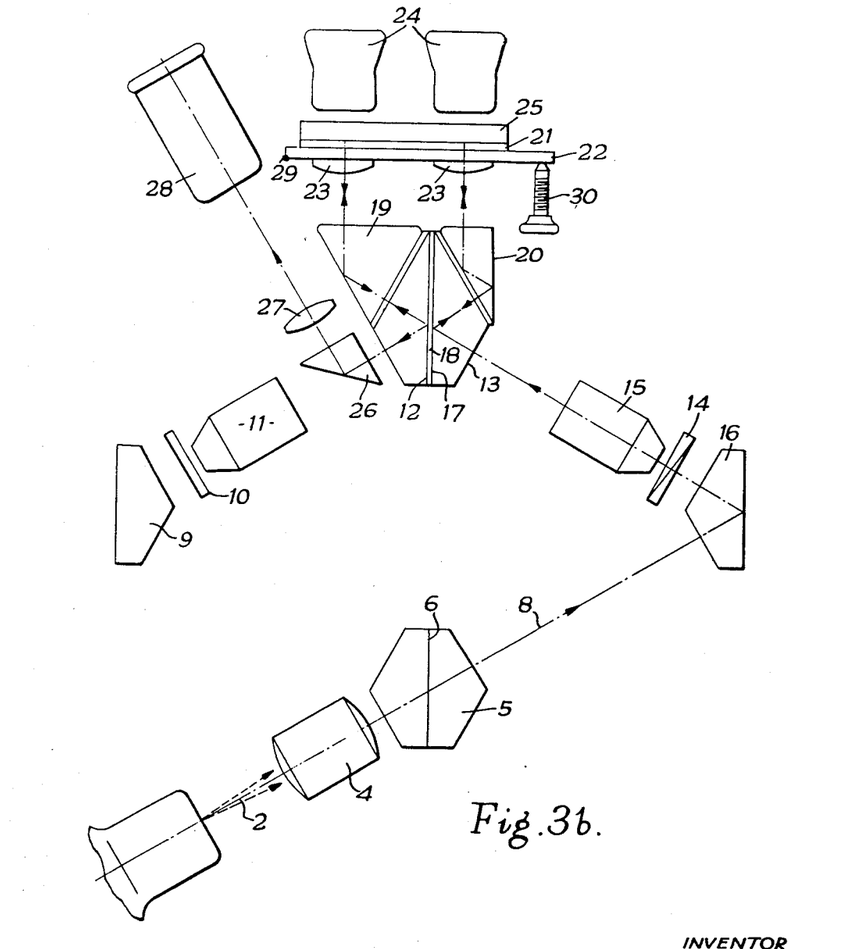
Figure 3B shows the apparatus of Figure 3A modified for viewing.

In the second apparatus shown in Figures 3A and 3B the optical elements are so arranged that the angles of incidence at all the reflecting surfaces are 30° instead of 45°. Thus, the amount of polarization obtained on reflection at these surfaces is greatly reduced and a better balance can be obtained between the amplitudes of the beams 7 and 8 which, if polarized, are polarized in the same plane and thus are capable of producing interference effects. In these figures the parts corresponding to parts shown in Figures 1A and 1B are given the same reference numerals. It will be apparent that it is possible to reduce the incidence angles to the normal below 30° and thus to eliminate polarization to any desired extent.

Figure 4A:
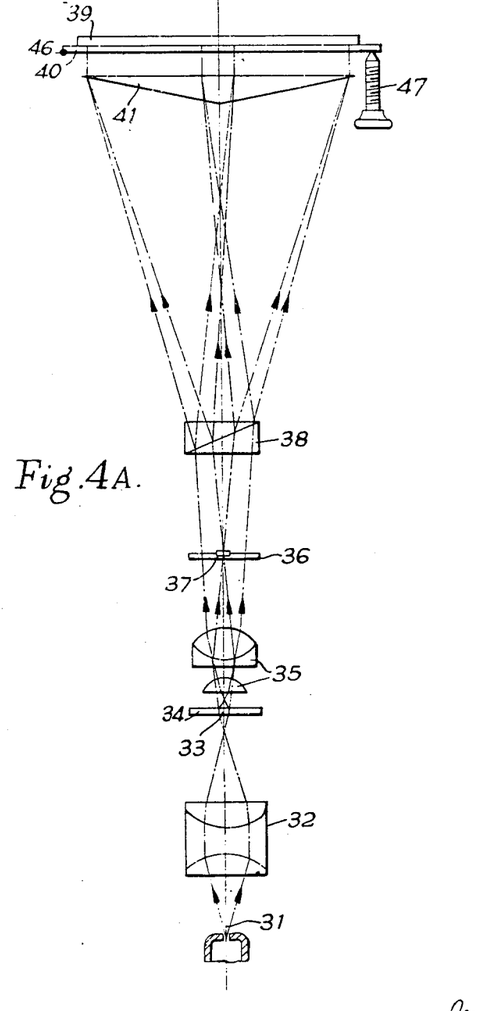
Figure 4A shows a third apparatus.

The third apparatus shown in Figure 4A has the advantage that it can be produced by suitable modifications of a comparatively simple nature to microscopes of known type, in particular to phase contrast microscopes. As in the previously-described apparatus monochromatic light from an aperture 31 and forming a specimen-illuminating beam is directed by a condenser lens system 32 on to a specimen 33 supported by a transparent slide 34, the system 32 producing an image of the aperture in or near the plane of the specimen. The light then traverses a microscope objective 35 arranged to produce a real image of the aperture 31 in a plane which is in or near the rear focal plane of the microscope objective and which is occupied by a transparent slide 36.

The slide 36 supports a "quarter-wave" plate 37, e. g. of mica, the area of the plate being such that the said real image of the aperture 31 falls entirely within its boundary while most of the light diffracted by the specimen by-passes it. The thickness of this plate 37 is such that it produces a phase difference of an odd number of quarter waves between, say, light having the direction of its electric vector in the plane of the drawing and light having the direction of its electric vector perpendicular to the plane of the drawing.

With this apparatus the specimen illuminating beam incident on the specimen and its support is, in effect, separated by the specimen itself into a single information-carrying beam and a single background beam. Thus, the part of the light incident on the specimen and its support which is diffracted at the specimen is the information-carrying beam and the part of the light which is unaffected by the specimen is the background beam. The comparatively large ratio between background and information-carrying beam intensities, which is desirable to ensure good results, is automatically obtained with specimens of small density, i. e. those diffracting less than 5–10% of the total density of the light incident thereon. In the case of denser specimens it is advisable to arrange that they are surrounded by a clear annular region to pass sufficient unaffected light to form an adequate background illumination.

Since the light forming the information-carrying beam is that which has been diffracted by the specimen, this light will be incident upon the part of the slide 36 surrounding the plate 37 and will be unaffected by that plate. The light forming the background beam will be incident on the plate 37 and the light transmitted thereby having its electric vector in one plane will differ in phase by an odd number of quarter-waves from the light transmitted thereby having its electric vector in a plane perpendicular to the said one plane, the light emerging from the plate 37 being as yet unpolarized.

The light which has traversed the slide 36 and plate 37 is incident upon a birefringent prism 38 (which preferably is a Wollaston prism), which splits each beam into two polarized beams having their electric vectors at right angles to one another, the last-mentioned beams being incident on the photo-sensitive surface of a photographic plate 39 supported by a frame or slide 40, and the arrangement of the microscope objective 35 being such that two images of the specimen are produced in the plane of the photosensitive surface. The two images produced by the objective 35 are tilted in opposite directions relative to the photographic plate and this tilt is compensated by a prism 41. Thus, the single information-carrying and single background beams are each split into two beams polarized at right angles to one another, and each information-carrying beam has associated therewith a respective background beam. The two information-carrying beams are in phase with one another, but owing to the action of the plate 37, the two background beams are out of phase by an odd number of quarter-waves, so that the necessary condition for the production of two complementary holograms is fulfilled.

The arrangement of the apparatus as far as the plate 37 is similar to that of phase contrast microscopes of the Zernicke type, the essential difference being that in phase contrast microscopes a phase displacement of an odd number of quarter waves is produced between an information-carrying beam diffracted by the specimen and a background beam which is not affected by the specimen, whereas in the apparatus of the invention a difference of an odd number of quarter waves is produced between the two phase displacements of the information-carrying beams relative to their respective background beams, the background beams having the directions of their electric vectors perpendicular to one another, and the phase displacement between each information-carrying beam and its respective background beam being of no importance.

The combined effect of the "quarter-wave" plate 37 and the Wollaston prism is that the two images A', B', and A'', B'' produced in the plane of the photosensitive surface have their electric vectors polarized at right angles to one another, they are of equal intensity and the phase displacements of the wave fronts of the two background beams relatively to the wavefronts of their respective information-carrying beams differ by an odd number of quarter waves. The photographic emulsion forming the photosensitive surface is, of course, insensitive to differences in the polarization of the electric vectors.

Figure 4B:
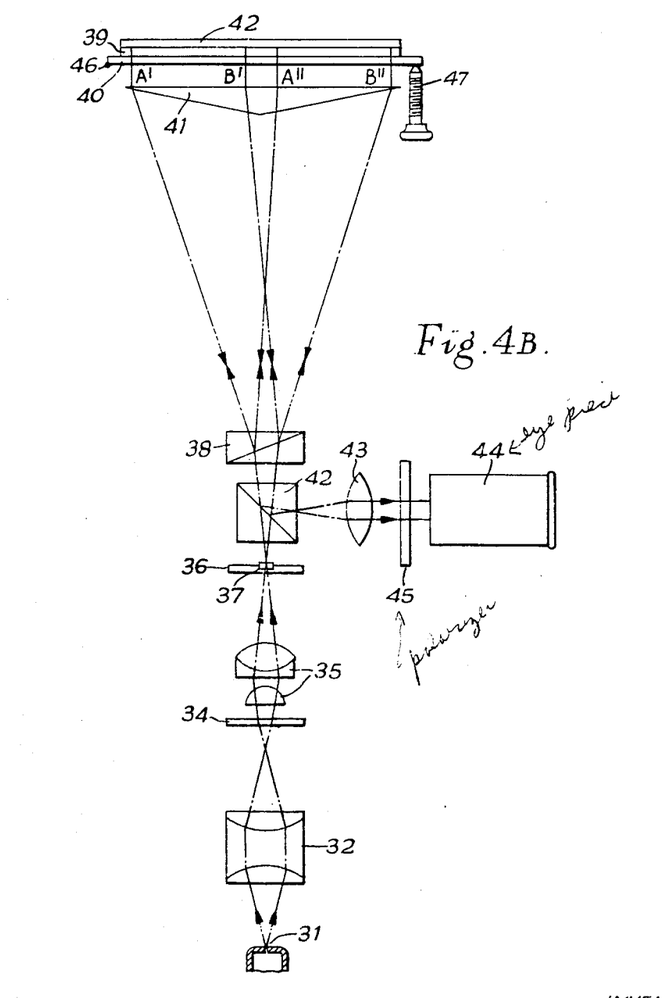
Figure 4B shows the apparatus of Figure 4A modified for viewing.

Referring now to Figure 4B, when viewing the two holograms a face-silvered mirror 42 is placed above the plate 39, as in the previously-described apparatus, and a semi-reflecting prism 42 is provided to reflect light from the Wollaston prism 38 through a field lens 43 to an eye-piece 44. Owing to the presence of the prism 38 the two beams of light from the holograms are polarized at right angles to one another so that on recombination there is no interference betweeen the two beams, the only effect being that the intensities of the beams are added. In order to bring them to interference a polarizer 45 is introduced in the optical path between the prism 38 and the eye-piece 44, the plane of polarization thereof being at 45° to the planes of polarization of the two beams in the recombined beam. The required phase displacement of an odd number of quarter waves between the two beams in the recombined beam is produced, as in the previously-described microscopes, by tilting the frame 40 carrying the plate 39 about an axis 46, a micrometer screw 47 being provided for this purpose.

In Figures 4A and 4B, the transverse dimensions of the apparatus have been exaggerated to enable the parts thereof to be clearly illustrated (also in Figures 1A to 3B). In practice, when using the full field of the apparatus the diameter of the images A' B', A'' B'' on the photographic plate will be about 10 mm. each. Hence, the quarter-wave plate 37, its support 36 and the prism 38 can readily be accommodated in a microscope tube of normal diameter, or only slightly larger. Thus, it will be apparent that a normal microscope of known type can readily be converted to be in accordance with the invention with relatively few alterations.

It will be apparent that other birefringent beam splitting means such as, for example, a Rochon prism can be used to replace the Wollaston prism 38.

If it is desired to use the apparatus of Figures 4A and 4B also as a phase contrast microscope the quarter-wave plate 37, which will usually be of mica, may be arranged relatively to its supporting slide 36, which will usually be of glass, so that in one of the two holograms the phase displacement between an information-carrying beam which has passed only through the supporting slide 36 and a background beam which has passed through the plate 37 and the support 36 is an odd number of quarter waves. In this case the said one of the two photographs will represent pure phase contrast and the other of the two photographs pure amplitude contrast, the photographs being obtained simultaneously.

It will also be evident that the holograms may be produced by illuminating the object with non-visible radiation, e. g. radiation in the infra-red or ultra-violet regions, and by using a photographic plate sensitive to non-visible radiation of the wavelength used. If the holograms thus produced are viewed with visible light a visible reproduction will be obtained. At the present time microscopes in accordance with this invention can be used with sources of wavelengths over the range 2,000 to 14,000 A. U. and photographic emulsions are known having sufficient sensitivity to light of this range of wavelengths.

Irregularities in any of the optical elements which might cause a disturbance of the interference pattern (e. g. irregularities in the photographic plate or the slide supporting the specimen) must be compensated by homogeneous immersion e. g. in oil, of these elements, as in all experiments in diffraction microscopy.

In the appended claims the term "photographic plate" refers to either a photo-sensitive plate or to a plate carrying holograms.

I claim:

1. Optical apparatus of the kind with which a specimen can be illuminated by a beam of coherent light and a photographic record can be obtained of an interference pattern produced as a result of the illumination, and for viewing such records with a source of coherent light, the apparatus including means for supporting a specimen to be examined in a first plane, means for supporting a photographic plate in a second plane, means providing a beam of coherent light, a beam-splitter of the partly-transmitting and partly-reflecting type for dividing said beam into a high-intensity background beam and an illuminating beam of relatively low intensity with respect to the background beam, means for directing said illuminating beam onto said specimen, second beam-splitting means receiving the light beam transmitted from said specimen and forming two information-carrying beams of approximately equal intensity and directing them upon separate portions of said photographic plate, means dividing said background beam into two high-intensity background beams superimposed upon the two low-intensity information-carrying beams within said separate areas of said photographic plate, and phase-shifting means producing a difference of an odd number of quarter-waves between the phase displacements of the wave-fronts of the two background beams relatively to the wave-fronts of their respective information-carrying beams.

2. Optical apparatus of the kind with which a specimen can be illuminated by an illuminating beam of coherent light and a photographic record can be obtained of an interference pattern produced as a result of the illumination, the apparatus including means for supporting a specimen to be examined in a first plane, means for supporting a photographic plate in a second plane, means providing a primary beam of coherent light, means projecting a first portion of said primary beam through said specimen and forming a pair of secondary beams of relatively low intensity carrying information about said specimen, means transmitting a second portion of said primary beam past said specimen and for forming said second portion into a second pair of secondary beams of relatively high intensity with respect to said first pair of beams, and means directing said secondary beams in interfering pairs upon two separate areas of said photographic plate, each interfering pair comprising a low-intensity beam and a high-intensity beam, and means producing a difference of an odd number of quarter-waves between the phase displacements of the wave-fronts of the two high-intensity beams relatively to the wave-fronts of their respective information-carrying beams.

3. Optical apparatus according to claim 1, wherein said photographic plate comprises a photographic record of two holograms in said second plane, reflecting means located behind said second plane for redirecting back through said second plane the two background beams of coherent light passing through said holograms, means including said beam-splitting means for combining the two beams after the said redirection to produce interference therebetween, an eye-piece, a reflector removably mounted between said first plane and said beam-splitting means for blocking the beam from said specimen and for receiving the said recombined beams from said beam-splitting means and directing the recombined beams onto said eye-piece, and means for varying the phase displacement between the wave-fronts of the background beams.

4. Optical apparatus according to claim 3, wherein said means for varying the phase displacement between the wavefronts of the background beams comprise a frame for supporting the photographic record in said second plane, the frame being mounted for tilting movement to vary relatively to one another the optical path lengths for the background beams between the source of coherent light and the frame, and a micrometer screw controlling the said movement of the frame.

5. Optical apparatus according to claim 3, and for viewing the photographic record in a dark field, wherein an opaque spot is disposed in a plane in which a real image of the source of coherent light is formed, and is so arranged that it intercepts the light forming the said real image and prevents its transmission to the said eye-piece.

6. Optical apparatus according to claim 1, wherein the said partly-reflecting and -transmitting means are so arranged that the intensity of the said illuminating beam is between 10% and 0.05% of the intensity of the background beam.

7. Optical apparatus according to claim 1, wherein the means directing each of the said information-carrying beams together with a different one of two background beams upon a separate portion of the said second plane, and producing a difference of an odd number of quarter waves between the phase displacements of the wavefronts of the two background beams relatively to the wavefronts of their respective image-carrying beams comprise a quadrature prism providing two partly-reflecting and -transmitting layers disposed parallel to one another and spaced a predetermined distance apart.

8. Optical apparatus according to claim 7, wherein the space between the said two partly-reflecting and -transmitting layers of the quadrature prism is filled by a layer of transparent aluminium oxide.

9. Optical apparatus according to claim 7, wherein additional prisms are provided in association with the quadrature prism, the arrangement being such that the beams transmitted and reflected by the said two partly-reflecting and -transmitting layers of the quadrature prism each undergo the same number of reflections, so that the beams incident on the said second plane have the same orientation.

10. Optical apparatus according to claim 2, wherein the means producing a phase displacement of an odd number of quarter waves between the wavefronts of the two background beams relatively to the wavefronts of their respective information-carrying beams comprise a birefringent quarter wave plate so arranged that it is traversed by light forming the information-carrying beams.

11. Optical apparatus according to claim 2, wherein said means directing said secondary beams in interfering pairs upon two separate areas of said photographic plate comprises a birefringent prism.

12. Optical apparatus according to claim 10, wherein the said birefringent quarter-wave plate is so arranged that, at least in the said second plane one of the two information-carrying beams is in pure phase-contrast relation to its respective background beam and the other information-carrying beam is in pure amplitude-contrast relation to its respective background beam.

13. Optical apparatus according to claim 11, and including means for supporting a photographic record comprising two holograms in said second plane, an eyepiece receiving a beam comprising two background beams combined by the birefringent prism and a polariser disposed in the path of the last-mentioned beam between the birefringent prism and the eyepiece.

References Cited in the file of this patent

UNITED STATES PATENTS

| 1,528,931 | Lihotzky | Mar. 10, 1925 |
| 2,660,922 | Philpot | Dec. 1, 1953 |

FOREIGN PATENTS

| 51,732 | France | Jan. 11, 1943 |
| | (1st addition to 861,490) | |
| 639,014 | Great Britain | June 21, 1950 |

OTHER REFERENCES

Bedford et al., "Phase Contrast Microscopy for Opaque Specimens," Journal of the Optical Society of America, vol. 40, No. 5, May 1950, pages 314–316.